United States Patent [19]
Meeks

[11] Patent Number: 5,090,185
[45] Date of Patent: Feb. 25, 1992

[54] MOWER

[76] Inventor: Earl L. Meeks, 134 Rockbridge Rd., Lilburn, Ga. 130247

[21] Appl. No.: 653,062

[22] Filed: Feb. 11, 1991

[51] Int. Cl.$^5$ ............................................. A01D 57/12
[52] U.S. Cl. ..................................................... 56/16.7
[58] Field of Search ...................... 56/16.7, 12.7, 13.6, 56/14.5, 17.6, 255, 289, 295, DIG. 17

[56] References Cited
U.S. PATENT DOCUMENTS 3,154,903 11/1964 Smith ................................ 56/16.7 X
3,918,242 11/1975 Harris .................................... 56/16.7

*Primary Examiner*—Thuy M. Bui
*Attorney, Agent, or Firm*—Michael V. Drew

[57] ABSTRACT

A mower has blades connected to a rim which surrounds the mower's wheels. The blades may be those that cut by rotational motion or those that cut by reciprocating scissor-type motion. The wheels of the mower are able to point in any direction because each wheel of the mower is rotatable and steerable 360 degrees about the axis of the wheel's support shaft. According to an additional aspect of the invention, each of the aforementioned wheels is driven by a hydraulic motor and the direction in which the wheels are steered is controlled by a chain connecting all of the wheels through the engagement of a sprocket affixed to each wheel.

19 Claims, 4 Drawing Sheets

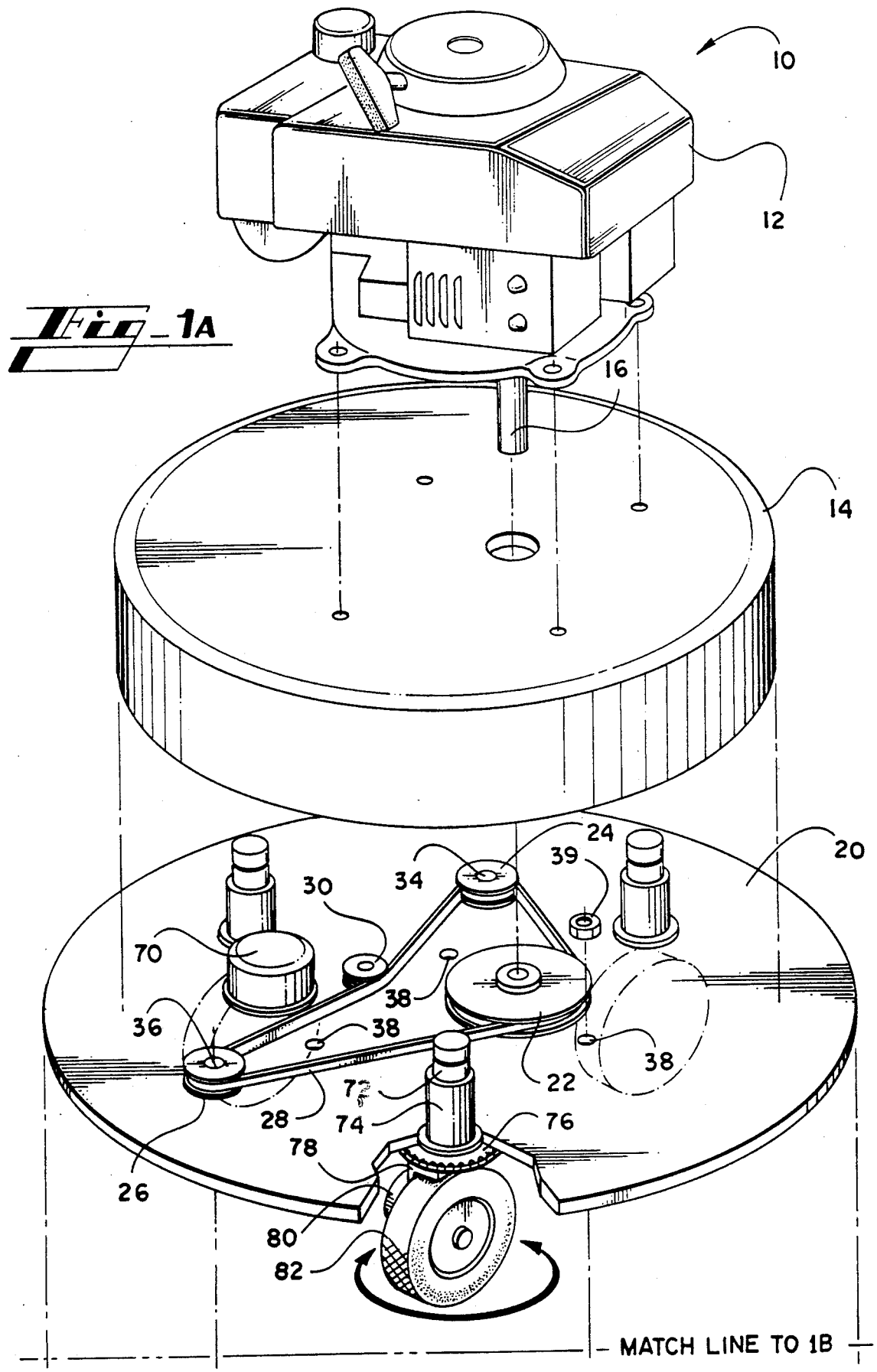

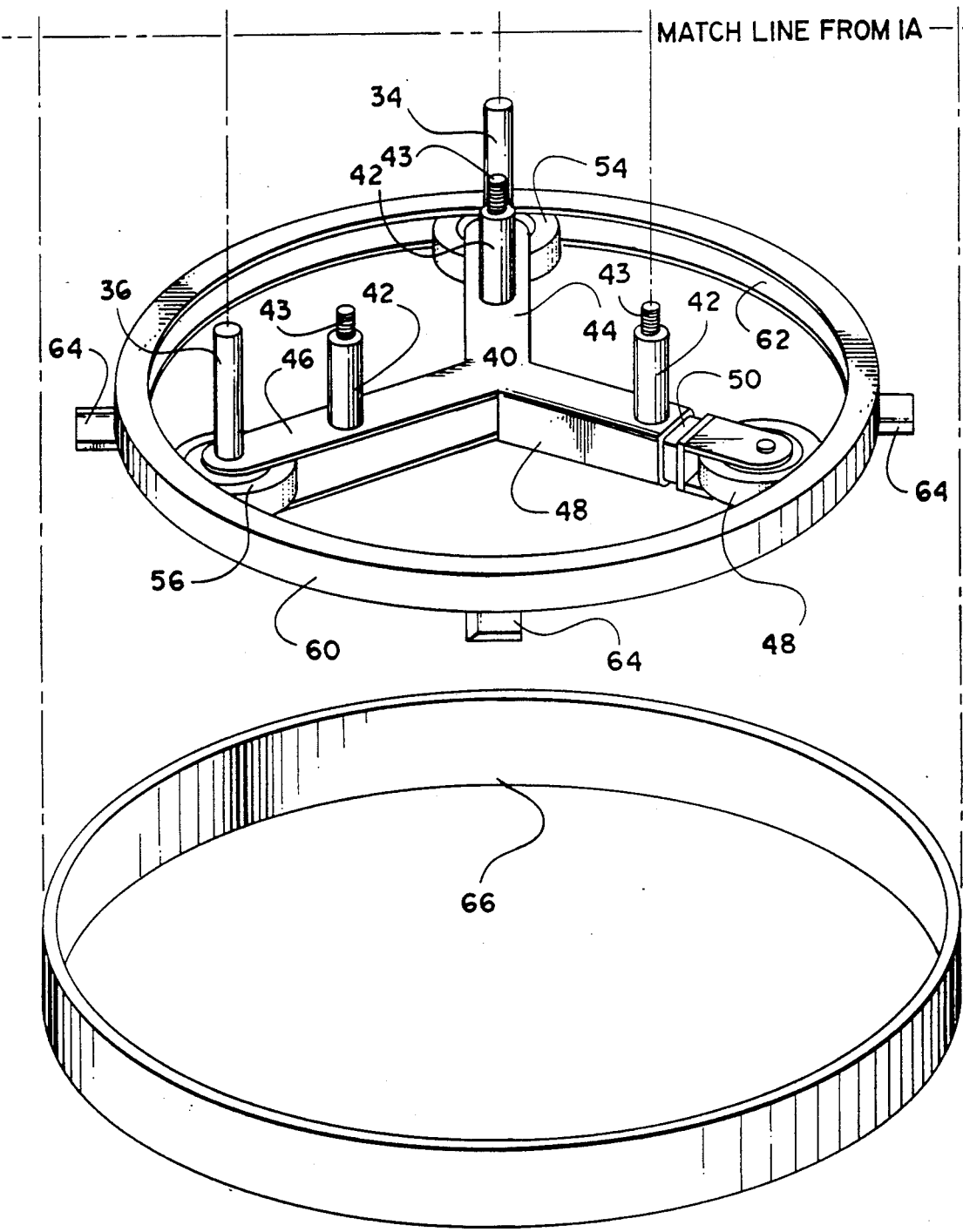

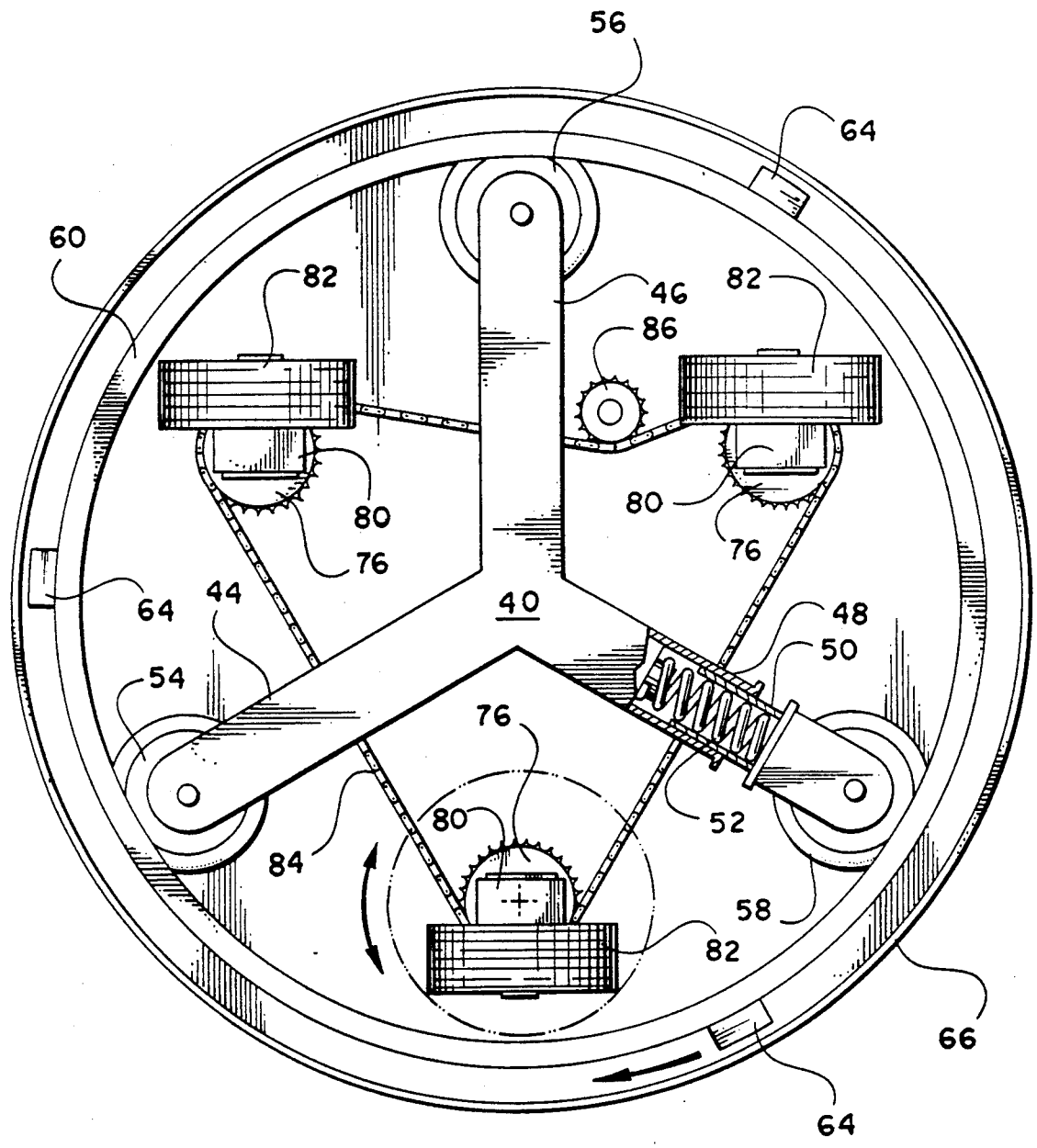
Fig_2

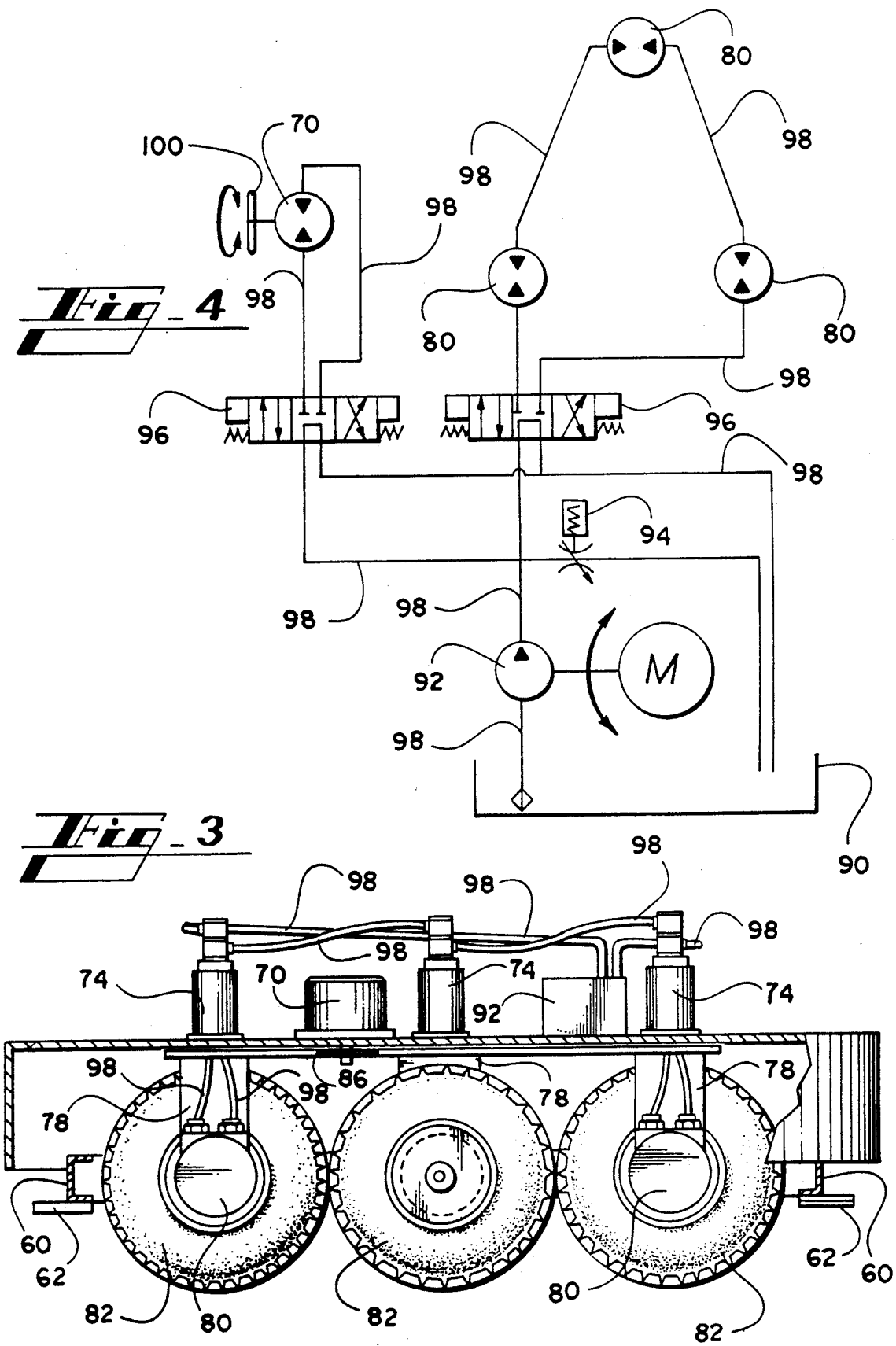

MOWER

TECHNICAL FIELD OF THE INVENTION

The invention relates to mowers, and more particularly to rotary-blade and reciprocating-blade mowers which have cutting blades that rotate outside of the perimeter defined by the mower's wheels, which are not limited to one direction of forward travel but which can move in any direction and which are self-propelled.

BACKGROUND OF THE INVENTION

A problem in operating typical rotary-blade mowers is that a great deal of maneuvering is often required to change directions at the end of a row or to cut grass close to obstructions such as trees, fence posts, fences, walls and the like. The crux of the problem is that typical mowers are limited to one direction of forward motion and have only one edge of the cutting area that will cut reasonably close to obstructions. Both of these restrictions are primarily due to the fact that the wheels of the mower are outside of the cutting perimeter of the blades of the mower, and additionally due to the fact that the wheels are individually restricted in their direction of travel.

SUMMARY OF THE INVENTION

It is an object of this invention to provide a mower that can cut very close to obstructions.

It is a further object of the invention to provide a mower that can cut very close to obstructions along the entire periphery of the cutting area of the blades.

It is also an object of the invention to provide a mower that has no single designated direction of forward travel and that can be easily maneuvered in any direction.

According to a broad aspect of the invention, a mower has blades connected to a rim which surrounds the mower's wheels. The blades may be those that cut by rotational motion or those that cut by reciprocating, scissor-type motion. In a further aspect of the invention the wheels of the mower are able to point in any direction because each wheel is supported by a shaft which is rotatable and steerable 360 degrees about the axis of the shaft. According to an additional aspect of the invention, each of the aforementioned wheels is driven by a hydraulic motor and the direction in which the wheels are steered is controlled by a chain connecting all of the wheels through the engagement of a sprocket affixed to each wheel.

The invention in general provides a highly maneuverable and versatile mower. The blades of the mower define a cutting perimeter that is outside of the perimeter defined by the wheels. The cutting perimeter is able to extend to the outer periphery of the mower. Thus, the invention provides a mower which is able to cut very close to obstructions and able to do so along the entire edge of the cutting area and edge of the mower. In addition, because the wheels are fully rotatable and steerable in any direction, the mower can be guided in any direction irrespective of its current direction of travel.

Other aspects, objects, features, and advantages of the present invention will become apparent to those skilled in the art upon reading the detailed description of preferred embodiments in conjunction with the accompanying drawings and appended claims.

DESCRIPTION OF THE DRAWINGS

FIGS. 1A and 1B compose an exploded, isometric view of a mower embodying teachings of the present invention.

FIG. 2 is a bottom view of the invention of FIGS. 1A and 1B, embodying additional teachings of the invention.

FIG. 3 is a partial sectional view of the invention of FIGS. 1A and 1B, embodying additional teachings of the invention.

FIG. 4 is a schematic view of a hydraulic system for the invention of FIG. 3

DETAILED DESCRIPTION OF PREFERRED EMBODIMENTS OF THE INVENTION

While the specification concludes with claims particularly pointing out and distinctly claiming the subject matter which is regarded as the present invention, the invention will now be described with reference to the following detailed description of exemplary embodiments taken in conjunction with the accompanying drawings.

In the drawings, which are discussed below, the same reference numerals refer to the same features of the invention throughout the drawings.

A mower 10 according to a preferred embodiment of the invention is shown in FIGS. 1A and 1B. A base 20 supports a motor 12 which provides the power for operation of the mower 10. The motor 12 may be any standard mower-type motor. Referring briefly particularly to FIG. 1B, therein is shown the cutting mechanism for the mower 10. Cutting is performed by blades 64 mounted upon a rotatable rim 60. Referring now also to FIG. 1A, the rim 60 encircles and rotates around the wheels 82 of the mower 10. Support and rotation of the rim 60 is facilitated by rollers. In the embodiment illustrated three rollers 54, 56, and 58 perform the function. Power is imparted to the rim 60 through at least one roller 54, 56 or 58. Although fewer rollers or more rollers may be used, three rollers will provide adequate support while also providing adequate power. The inner periphery of the rim 60 forms a channel 62. The wheels 54, 56 and 58 fit within the channel 62. The channel 62 enables the wheels 54, 56 and 58 to support the rim 60. The channel 62 also provides a sure track within which the rollers 54, 56 and 58 may engage the rim 60. Each roller 54, 56 and 58 may be directly affixed to the base 10. However, the embodiment shown illustrates a more versatile method of connection. FIG. 1B illustrates a roller frame 40 mechanism for supporting the rollers 54, 56, and 58. The roller frame 40 has three roller frame members 44, 46, and 48 for respectively supporting the three rollers 54, 56 and 58. The roller frame is attached to the base 20 by any suitable means. The embodiment illustrated employs roller frame supports 42 having one end of each respectively attached to a roller frame member 44, 46 and 48, and the other end attached to the base 20 through holes 38 by nuts 39 screwed onto threaded tops 43 of the roller frame supports 42. The rollers 54, 56 and 58 are affixed to the outer-most ends of the roller frame members 44, 46 and 48. The rollers 54, 56 and 58 must be maintained in close contact with the bottom of the channel 62 of the rim 60 to obtain optimal rim 60 rotation. The embodiment illustrated employs a spring in its roller frame 40 mechanism to keep the rollers 54, 56 and 58 pressed into the rim 60. The spring is used in conjunction with a telescoping, extendable roller frame member 48. Although several or all of the roller frame members 44, 46 or 48 may be so configured, the use of one roller frame member 48 as illustrated is sufficient to achieve the desired result.

Referring now also to FIG. 2, the structure of the telescoping roller frame member 48 can be better appreciated. The telescoping roller frame member 48 is open at its end opposite where it is connected to the roller frame 40. A roller frame extension member 50, loaded by a spring 52, is inserted into the open end of the roller frame member 48. As power is imparted to at least one of the rollers 54, 56 or 58, causing the roller 54, 56 or 58 to rotate, contact between the roller 54, 56 or 58 and the bottom of the channel 62 of the rim 60 causes the rim 60 to rotate. Contact between the rollers 54, 56 and 58, and the bottom of the channel 62 of the rim 60 may be enhanced by the selection of materials for the contact surfaces that have a high coefficient of friction. For example, hard rubber to hard rubber. The use of this material would enhance contact between the surfaces but also would permit slippage between the rollers 54, 56 and 58 and the rim 60 if a blade 64 accidentally encounters an immovable object such as a boulder or tree stump. Slippage between the blade rim 60 and rollers 54, 56 and 58 would help to prevent or limit damage to the mower 10. Other combinations of materials are also possible. For example, polyurethane for the rollers 54, 56 and 58 and rubber for the bottom of the channel 62. Contact between the roller 54, 56 and 58 may also be enhanced by the use of a rack-and-pinion arrangement with the rollers 54, 56 and 58 forming pinions and the bottom of the channel 62 of the rim 60 forming a circular rack. This arrangement, however, would not permit slippage. The use of a spring-loaded frame member 48 also provides for a convenient method of removing or installing the rim 60 in that installation or removal may be achieved by depressing the extension member 50 into the frame member 48. This allows all of the rollers 54, 56 and 58 to be disengaged from the channel 62 of the rim 60, and further to be moved out of the plane of the rim 60. Installation of the rim 60 may be achieved by reversing the procedure.

Referring now particularly back to FIG. 1A, therein is illustrated the mechanism for imparting power to the rim 60. Although power for rotating the rim 60 could be imparted through all of the rollers 54, 56, and 58, in this embodiment power is imparted only through two rollers 54 and 56, while the third roller 58 serves as a stabilizer. Power is transmitted from the motor 12 to the rollers 54 and 56 through a drive shaft 16 and network of pulleys 22, 24, 26 and 30, and a drive belt 28. The drive shaft 16 has one end connected to the motor 12 and the other end connected to a drive pulley 22 mounted on the base 20. Each of two rollers 54 and 56 has a pulley 24 and 26, respectively, attached thereto. The rollers 54 and 56 may be respectively connected to the pulleys 24 and 26 by any suitable means, such as shafts 34 and 36. A drive belt 28 encircles the pulleys 22, 24 and 26. The belt 28 may be taut around the pulleys 22, 24 and 26, or slack. The power imparted from the motor 12 to the drive pulley 22 is transmitted through the drive belt 28 to the roller pulleys 24 and 26 when the belt is taut. When the belt 28 is loose, or slack, no power is imparted to the roller pulleys 24 and 26. A tension pulley 30 is moveable between a position wherein it keeps the belt 28 taut and a position wherein the belt 28 is loose. The pulleys 22, 24, 26 and 30 and belt 28 will also permit slippage if the blades 64 encounter an immovable object. For safety, a blade guard 66 encircles the blades 64 and rim 60.

Referring momentarily to FIG. 2 and FIG. 3, the manner in which the rim 60 with cutting blades 64 encircles the wheels 82 is illustrated. The blades 64 may be placed extremely close to an obstacle because the periphery of the cutting path, or cutting area, is limited only by the blade guard 66. To provide greater flexibility and maneuverability, each wheel 82 is completely rotatable and steerable about its axis of support through 360 degrees. This allows the mower 10 to travel in any direction. The embodiment illustrated employs three wheels 82. Each wheel is attached to the base 20 through a wheel support 78 and a wheel support shaft 72. The wheel support shafts 72 are contained within the wheel shaft sleeves 74. Each wheel support 78 is rotatable within the wheel support shaft 72. The mower 10 is made even more maneuverable by the use of motors to propel the wheels 82. The motorized system used by the illustrated embodiment of the invention employs a hydraulic motor 80 affixed to each wheel. The hydraulic wheel motors 80 are connected to each other and to a common sump 90 and fluid pump 92 by fluid lines 98. All of the motors 80 operate at the same speed because they are joined together in series by the fluid lines 98. Maneuverability and flexibility of the mower 10 may be further increased by synchronous steering of the wheels 82. Synchronous steering is achieved by utilizing sprockets 76 and 86 and a connecting chain 84. A wheel sprocket 76 is affixed to each wheel support 78. A drive sprocket 86 is connected to a steering motor 70. As the steering motor 70 is actuated the drive sprocket 86 is rotated clockwise or counterclockwise. The drive sprocket 86 is connected to the wheel sprockets 76 by the steering chain 84. Rotation of the drive sprocket 86 causes rotation of the wheel sprockets 76 and thus changes the direction of travel of the wheels 82.

Referring now to FIG. 4, therein is illustrated a schematic of the hydraulic system that governs the steering system and the wheel motors 80. In addition to the hydraulic features discussed, the schematic illustrates a hydraulic sump 90, the hydraulic fluid motor 92, a bleed-off valve 94, control valves 96 for the wheel motors 80 and the steering motor 70, and a steering actuator 100 that controls the steering motor 70. The steering actuator 100 may be radio-controlled so that the mower can be operated by remote control. This would allow for even greater flexibility and maneuverability.

As should be apparent from the foregoing specifications, the invention is susceptible of being modified with various alterations and modifications which may differ from those which have been described in the preceding specification and description. For example, the cutting blades 64 are illustrated as three rectangular-like cutting blades. However, there may be fewer or more blades of this sort or there may be pieces of cord or wire which serve as cutting blades. In addition, the cutting action is illustrated and described as being achieved by a rotating rim 60 with blades 64; however, cutting may be achieved by a set of reciprocating rims and blades that cut by scissor-like motion. Accordingly, the following claims are intended to cover all alterations and modifications which do not depart from the spirit and scope of the invention.

What is claimed is:

1. A lawn mower comprising:
a base;

a motor mounted upon said base;

a rim having an outer periphery and an inner periphery, and having at least one cutting blade extending from said outer periphery;

means for supporting and rotating said rim;

means for transmitting power from said motor to said means for supporting and rotating said rim; and a plurality of wheels affixed to said base within said inner periphery of said rim.

2. The invention of claim 1, said means for supporting and rotating said rim comprising:

roller support means affixed to said base; and a plurality of rollers affixed to said roller support means, wherein at least one of said plurality of rollers is connected to said means for transmitting power from said motor to said means for supporting and rotating said rim, and wherein said rollers firmly but rollably engage said inner periphery of said rim.

3. The invention of claim 2, said roller support means comprising a roller frame.

4. The invention of claim 2, said means for transmitting power from said motor to said means for supporting and rotating said rim comprising:

a drive shaft having an end connected to said motor and having an other end;

a drive pulley mounted upon said base and affixed to said other end of said drive shaft;

at least one roller pulley corresponding to and respectively affixed to said plurality of rollers; and a drive belt connecting said drive pulley and said at least one roller pulley.

5. The invention of claim 2, said inner periphery of said rim forming a channel for receiving said plurality of rollers.

6. The invention of claim 1, said means for supporting and rotating said rim comprising:

a roller frame affixed to said base, said roller frame having a plurality of roller frame members extending radially from a center of said roller frame; and a plurality of rollers corresponding to and respectively connected to said plurality of roller frame members, said plurality of rollers firmly but rollably engaging said inner periphery of said rim, wherein at least one of said plurality of rollers is connected to said means for transmitting power from said motor to said means for supporting and rotating said rim.

7. The invention of claim 6, wherein at least one of said plurality of roller frame members comprises:

an open-ended roller frame member defining an open end distal said center of said open-ended roller frame; and a roller frame extension member having an end for receiving a said roller and having an other end spring-loaded and inserted into said open end of said openended roller frame member.

8. The invention of claim 6, said means for transmitting power from said motor to said means for supporting and rotating said rim comprising:

a drive shaft having an end connected to said motor and having an other end;

a drive pulley mounted upon said base and affixed to said other end of said drive shaft;

at least one roller pulley corresponding to and respectively affixed to said plurality of rollers; and a drive belt connecting said drive pulley and said at least one roller pulley.

9. The invention of claim 6, said inner periphery of said rim forming a channel for receiving said plurality of rollers.

10. The invention of claim 1, wherein each of said plurality of wheels is connected to said base by a wheel shaft about which a longitudinal axis of said wheel shaft each said wheel is fully pivotable.

11. The invention of claim 10, further comprising means for steering said plurality of wheels in unison.

12. The invention of claim 11, said means for steering said plurality of wheels in unison comprising:

a wheel sprocket affixed to each said wheel;

a drive sprocket;

a chain engaging said wheel sprockets and said drive sprocket; and means for selectively rotating said drive sprocket.

13. The invention of claim 1, wherein each said wheel is driven by a wheel motor.

14. The invention of claim 13, each said wheel motor comprising a hydraulic motor system.

15. A mower comprising: a base; a motor mounted upon said base;

a rim having an outer periphery and an inner periphery defining a channel, and having at least one cutting blade attached to said outer periphery;

a roller frame attached to said base, having a plurality of roller frame members extending radially from a center of said roller frame, wherein at least one of said plurality of roller frame member defines an open end having a springloaded extension frame member telescopically inserted therein;

a plurality of rollers corresponding to and respectively connected to said plurality of roller frame members and said at least one extension frame member, said plurality of rollers firmly but rollably engaging said inner periphery of said rim;

at least one roller pulley attached to a respective one of said plurality of rollers;

a drive pulley;

a motor shaft having an end connected to said motor and having an other end connected to said drive pulley;

a drive belt connecting said drive pulley and said at least one roller pulley;

a plurality of wheels rotatably connected to said base, within said inner periphery of said rim, wherein each said wheel is fully rotatable about a perpendicular axis to said base; and means for steering said plurality of wheels rotatably connected to said base in unison.

16. The invention of claim 15, further comprising:

a plurality of hydraulic motors corresponding to and respectively connected to said plurality of wheels rotatably connected to said base; and means for supplying hydraulic fluid to and discharging hydraulic fluid from each said hydraulic motor.

17. The invention of claim 15, said means for steering said plurality of wheels in unison comprising:

a plurality of wheel sprockets corresponding to and respectively connected to said plurality of wheels;

a drive sprocket;

a chain engaging said wheel sprockets and said drive sprocket; and means for selectively rotating said drive sprocket.

18. A mower comprising:

a base;

a motor mounted upon said base;

a motor shaft having an end connected to said motor and having an other end;

a rim having an outer periphery and an inner periphery defining a channel, and having at least one cutting blade attached to said outer periphery;

a roller frame attached to said base and having a plurality of roller frame members extending radially from a center of said roller frame, and wherein at least one of said plurality of roller frame members defines an open end having a springloaded extension frame member telescopically inserted therein;

a plurality of rollers corresponding to and respectively connected to said plurality of roller frame members and said at least one extension frame member, said plurality of rollers firmly but rollably engaging said inner periphery of said rim;

at least one roller pulley attached to a respective one of said plurality of rollers;

a drive pulley attached to said other end of said motor shaft;

a drive belt connecting said drive pulley and said at least one roller pulley;

a plurality of wheel support sleeves mounted upon said base within said inner periphery of said rim;

a plurality of wheel support shafts corresponding to and respectively rotatably mounted within said plurality of wheel support sleeves, wherein each said wheel support shaft is fully rotatable about a longitudinal axis through a respective said wheel support shaft;

a plurality of wheels corresponding to and respectively affixed to said wheel support shafts;

a plurality of hydraulic motors corresponding to and respectively affixed to each said wheel;

means for supplying hydraulic fluid to and discharging hydraulic fluid from each said hydraulic motor;

a plurality of wheel sprockets corresponding to and respectively affixed to said plurality of wheels;

a drive sprocket rotatably attached to said base;

a chain engaging said drive sprocket and said wheel sprockets; and means for selectively rotating said drive sprocket.

19. The invention of claim 18, having three roller frame members, and wherein one of said three frame members has a spring-loaded extension frame member, and wherein a said roller pulley is respectively attached to each of two of said rollers which are not attached to said spring-loaded extension frame member.

* * * * *